United States Patent
Plunk

(10) Patent No.: US 11,944,236 B2
(45) Date of Patent: *Apr. 2, 2024

(54) SOLID FUEL COOKING RANGE

(71) Applicant: Richard L. Plunk, Houston, TX (US)

(72) Inventor: Richard L. Plunk, Houston, TX (US)

( * ) Notice: Subject to any disclaimer, the term of this patent is extended or adjusted under 35 U.S.C. 154(b) by 268 days.

This patent is subject to a terminal disclaimer.

(21) Appl. No.: 17/307,373

(22) Filed: May 4, 2021

(65) Prior Publication Data

US 2021/0251425 A1   Aug. 19, 2021

Related U.S. Application Data

(63) Continuation of application No. 16/422,152, filed on May 24, 2019, now Pat. No. 10,993,582.

(51) Int. Cl.
| | | |
|---|---|---|
| *A47J 37/07* | (2006.01) | |
| *A47J 33/00* | (2006.01) | |
| *A47J 37/04* | (2006.01) | |
| *A47J 37/10* | (2006.01) | |

(52) U.S. Cl.
CPC ........... *A47J 37/0704* (2013.01); *A47J 33/00* (2013.01); *A47J 37/041* (2013.01); *A47J 37/0763* (2013.01); *A47J 37/0786* (2013.01); *A47J 2037/0795* (2013.01); *A47J 37/10* (2013.01)

(58) Field of Classification Search
CPC .. A47J 2037/0795; A47J 33/00; A47J 37/041; A47J 37/0704; A47J 37/0763; A47J 37/0786; A47J 37/10
See application file for complete search history.

(56) References Cited

U.S. PATENT DOCUMENTS

| | | | | |
|---|---|---|---|---|
| 6,798 | A * | 10/1849 | Clinton | F24B 1/202 126/2 |
| 1,566,900 | A * | 12/1925 | Adamson | F24B 1/202 126/275 R |
| 2,237,081 | A * | 4/1941 | Owens | A47J 36/26 126/25 R |
| 2,627,854 | A * | 2/1953 | Sava | F24B 1/205 312/258 |
| 3,682,154 | A * | 8/1972 | Mollere | A47J 37/0768 229/117.02 |
| 3,851,639 | A * | 12/1974 | Beddoe | A47J 37/0763 126/25 R |
| 4,488,535 | A * | 12/1984 | Johnson | A47J 37/0763 126/25 A |

(Continued)

FOREIGN PATENT DOCUMENTS

CH   369869 A * 6/1963

*Primary Examiner* — Jorge A Pereiro
*Assistant Examiner* — Logan P Jones
(74) *Attorney, Agent, or Firm* — Hunton Andrews Kurth LLP

(57) ABSTRACT

A solid fuel cooking range is described herein. Embodiments enable the user to cook food on an upper grill while simultaneously heating a separate dish in a lower oven. In certain embodiments, heat may be applied to the oven from both the top and bottom. Heat and airflow may be controlled using a shroud which does not enclose the sides of the upper cooking area and separate end plates. Embodiments may be portable and lightweight which enables the solid fuel cooking range to be used while traveling and in emergency situations.

14 Claims, 6 Drawing Sheets

(56) References Cited

U.S. PATENT DOCUMENTS

| | | | | |
|---|---|---|---|---|
| 4,531,505 | A | * | 7/1985 | Hait ........................ F24B 1/205 |
| | | | | 126/25 R |
| 5,404,864 | A | | 4/1995 | Kent, Jr. |
| 5,535,733 | A | * | 7/1996 | Hait ........................ F24B 1/202 |
| | | | | 126/26 |
| 6,508,167 | B1 | * | 1/2003 | Lu ........................ A47J 37/0745 |
| | | | | 99/421 A |
| 6,672,303 | B1 | * | 1/2004 | Emter ................. A47J 37/0713 |
| | | | | 126/41 R |
| 6,962,106 | B2 | | 11/2005 | Viraldo |
| 7,802,565 | B2 | | 9/2010 | Bruno |
| 8,127,757 | B1 | | 3/2012 | Bourgeois |
| 8,960,083 | B2 | | 2/2015 | Wang |
| 2004/0000303 | A1 | | 1/2004 | Regen et al. |
| 2011/0011387 | A1 | | 1/2011 | Sawaya |
| 2018/0368618 | A1 | | 12/2018 | Measom et al. |
| 2019/0125129 | A1 | | 5/2019 | Bittel |

* cited by examiner

SOLID FUEL COOKING RANGE

CROSS-REFERENCE TO RELATED APPLICATIONS

This application is a continuation of U.S. patent application Ser. No. 16/422,152, filed May 24, 2019, and granted on May 4, 2021 as U.S. Pat. No. 10,993,582, which claims priority from U.S. Provisional Application No. 62/675,845, filed on May 24, 2018, and U.S. Provisional Application No. 62/851,771, filed on May 23, 2019 the disclosures of which are each incorporated herein by reference in their entirety.

FIELD OF THE INVENTION

Embodiments disclosed herein relate to cooking equipment fueled by charcoal or other solid fuels.

BACKGROUND AND SUMMARY

A range is a cooking device that utilizes a liquid, gas and/or solid cooking fuel. Many ranges and grills consist of a single upper cooking area. Some cooking devices include an independently controlled cooking compartment which may be below or remote from the upper cooking area.

Many cooking devices rely on liquid or gaseous fuels. Solid fuel cooking devices are typically large and not easily portable. Additionally, solid fuel cooking devices provide a single cooking surface above the burning fuel.

These and other deficiencies exist. Accordingly, there is a need to provide users with an appropriate solution that overcomes these deficiencies to provide a portable solid fuel cooking range equipped with both an upper cooking surface and an oven compartment.

Disclosed embodiments relate to a solid fuel cooking range which may be configured to utilize both an upper grill and a lower oven. Some embodiments may be equipped with a bottom burner. Disclosed embodiments utilize solid fuel, including, but not limited to, charcoal, wood, and/or chemical combustibles. Multiple fuels may be used either alone or in combination depending on the circumstances and desired impact on the flavor. This ability to use multiple fuels makes the charcoal cooking range a useful emergency device as it may be used for cooking, sterilization, and/or as a personal heater under adverse conditions.

Disclosed embodiments may also be configured to allow use of the cooking range for grill cooking combined with simultaneous baking in the oven. Some embodiments allow the user to control the flow of smoke in order to impart a smoke flavor.

Embodiments of the present disclosure provide a portable solid fuel cooking range comprising a grill body that comprises grate hooks, vent holes, and shroud guides. The grill body defines a fuel chamber and an oven wherein the oven is positioned below the fuel chamber. The range further comprises a fire grate configured to support a solid combustible fuel within the fuel chamber and allow airflow to the solid combustible fuel placed on top of the fire grate; a cooking grate configured to cover the fuel chamber and be selectively attachable to the grate hooks of the grill body; a shroud with an offset handle configured to slidably attach to the grill body using the shroud guides; a left end plate and a right end plate, the end plates configured to be positioned between the grill body and the cooking grate; a bottom burner configured to be placed within the oven, the bottom burner comprising a burner plate and a base pan, the base pan configured to receive the burner plate and form a front hatch slot and a rear hatch slot between the burner plate and base pan, the burner plate comprising more than one charcoal receptacle; a front hatch configured to be inserted into the front hatch slot and partially enclose the oven; and a rear hatch configured to be inserted into the rear hatch slot and partially enclose the oven.

Embodiments of the present disclosure provide a method of baking, the method comprising providing a grill body defining a fuel chamber and oven, wherein the oven is below the fuel chamber, the grill body comprising grate hooks and shroud guides; igniting charcoal briquettes on top of a fire grate positioned within the fuel chamber; moving one or more charcoal briquettes from the fuel chamber to a charcoal receptacle of a bottom burner placed within the oven; attaching a cooking grate to the grill body above the fuel chamber by inserting the grate hooks into openings in the cooking grate; inserting a left end plate into a space between the cooking grate and grill body; inserting a right end plate into a space between the cooking grate and grill body; inserting a shroud comprising an offset handle into the shroud guides; and placing a food item to be baked onto the bottom burner within the oven.

Further features of the disclosed design, and the advantages offered thereby, are explained in greater detail hereinafter with reference to specific example embodiments illustrated in the accompanying drawings, wherein like elements are indicated by like reference designators.

DETAILED DESCRIPTION

Figure 1:
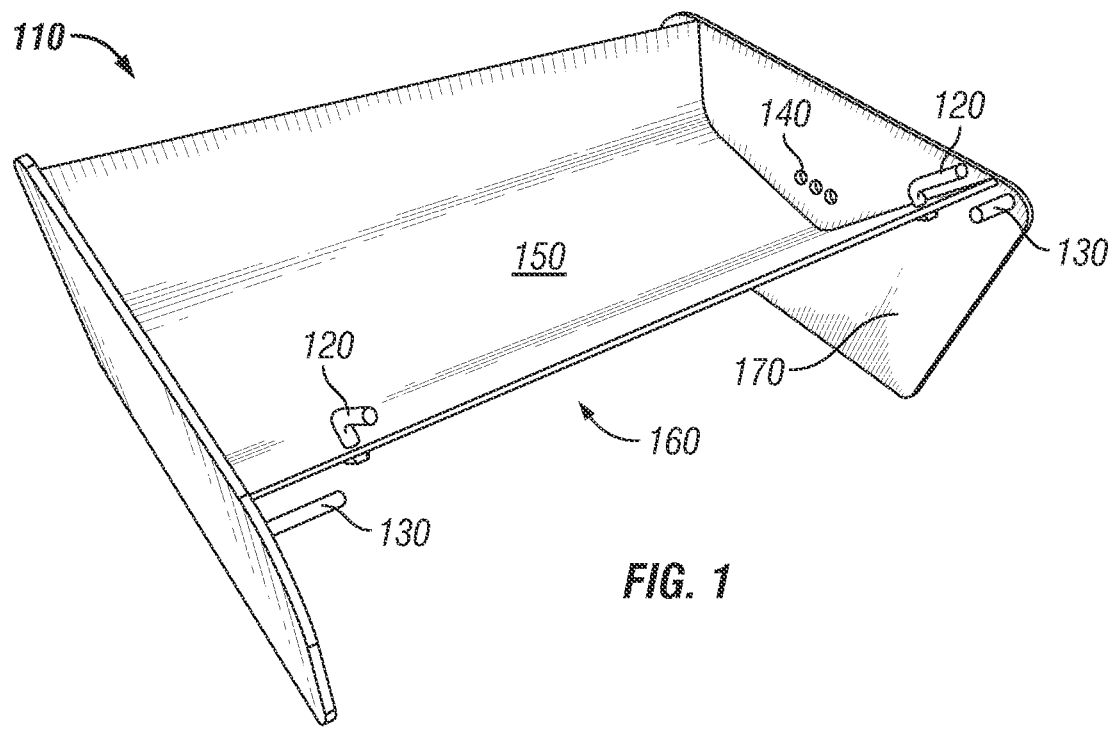
FIG. 1 illustrates a grill body according to an example embodiment.

The charcoal cooking range described comprises a grill body with grate hooks, vent holes, and shroud guides. The grill body may be designed to define a fuel chamber and an oven. A fire grate may be positioned within the fuel chamber so that a solid fuel, such as, for example, wood or charcoal, may be placed on top of the fire grate and ignited.

In some embodiments, a fire grate may be maintained in position by the sides of the grill body and the portion of the grill body forming the fuel chamber. In preferred embodiments, the grill body is configured to maintain the fire grate in the fuel chamber about level with respect to the grill body without the use of a retaining flange or bracket. In alternative embodiments, a retaining flange or other retaining structure may be utilized to support and/or secure the fire grate.

In some embodiments a cooking grate may be placed on top of the grill body covering the fuel chamber. The cooking grate may be held in place by inserting grate hooks into openings in the cooking grate. In some embodiments, the cooking grate may be positioned to hang over the front of the grill body. In some embodiments, the cooking grate may be positioned in order to overhang the front and rear of the grill body or be generally aligned with the grill body.

Some embodiments of the disclosed range comprise end plates. A left and right end plate may be used. The left and right end plate may be mirror images of each other, may be substantially the same as each other, or may be distinct from each other. In some embodiments, the end plates may comprise rotisserie supports for supporting a rotisserie spit or other cooking device. In some embodiments, the end plates may be positioned at the right and/or left edges of the grill body. The end plates may be configured and/or positioned to retain heat within an upper cooking area, adjust air flow, and/or support a spit as for rotisserie cooking.

Some embodiments comprise a shroud. The shroud may be slidably attached to the grill body using shroud guides. The shroud guides may be located at the rear of the grill body and used to maintain the shroud in a desired position. The shroud may be slidably adjusted within the shroud guides in order to cover substantially any portion of the upper cooking area and/or cooking grate. In some embodiments, the shroud comprises an offset handle which is biased closer to the front or rear of the shroud. In some embodiments, the shroud handle may be attached to the shroud with a handle stop that is configured to extend away from the interior surface of the shroud and engage with the cooking grate to maintain the shroud in a more stable position. In some embodiments, the shroud comprises attachment holes which are configured to receive grate hooks of the grill body. By inserting the grate hooks into the attachment holes of the shroud, the shroud may be selectively fixed to the grill body.

When charcoal or another solid fuel is placed on top of the fire grate and ignited, the heat released allows food to be cooked on the cooking grate. The use of end plates and a shroud allows a user to control the air flow and/or temperature control in the upper cooking area above the cooking grate. Heat generated by the solid fuel burning in the fuel chamber may also radiate through the grill body and into the oven below the fuel chamber. It will be appreciated that the heat radiating from the fuel chamber into the oven may heat the oven from above.

Disclosed embodiments comprise an oven defined by the grill body. Some embodiments further comprise a bottom burner which may be used to supply additional heat to the oven. The bottom burner comprises a burner plate and a base pan. The burner plate may be equipped with charcoal receptacles that are configured to accommodate charcoal briquettes. Heat from the burning briquettes may be used to heat food placed within the oven on top of the bottom burner.

When assembled, the burner plate may be inserted into the base pan to form the bottom burner. When the burner plate is inserted into the base pan, a small slot may be formed along the perimeter of the bottom burner. This slot may comprise a front hatch slot towards the front of the oven and a rear hatch slot towards the rear of the oven. Charcoal briquettes may be placed in charcoal receptacles and used to produce heat. The receptacles may comprise depressed and non-depressed portions in various configurations. In some embodiments the receptacles comprise a triangular portion configured to roll or otherwise agitate a charcoal briquette as it shrinks and combusts. The receptacles may be configured so that the resulting ash from the briquettes falls through the receptacles and is collected in the base pan.

Some embodiments comprise a front hatch and/or a rear hatch that may be used to enclose the oven. The front hatch may be inserted into the front hatch slot of the bottom burner and/or the rear hatch may be inserted into the rear hatch slot of the bottom burner. In some embodiments, the front and/or rear hatches have a convex exterior.

Disclosed embodiments may be used to cook one food item in an upper cooking area on or above the cooking grate and simultaneously cook a separate food item in the oven.

FIG. 1 illustrates a grill body 110 according to an example embodiment. Grill body 110 comprises grate hooks 120, shroud guides 130, and vent holes 140. The grill body 110 is configured to define a fuel chamber 150 and an oven 160 below the fuel chamber 150 and between the legs 170 of the grill body. As shown in FIG. 1, the legs 170 of the grill body 110 elevate the portion of the grill body 110 that forms the fuel chamber 150. The oven 160 is the space defined below the bottom of the fuel chamber 150 and in between the legs 170 of the grill body 110. The vent holes 140 allow air to enter the fuel chamber 150 from outside the grill body 110. When solid fuel is burned in the fuel chamber 150, the vent holes 140 provide air flow that may facilitate combustion of the solid fuel.

In some embodiments, the sides of the grill body 110 function as legs 170 which elevate a portion of the grill body 110 to define the oven 160. In some embodiments, the legs 170 of the grill body 110 include two generally planar sides as opposed to four separate legs.

In some embodiments, the oven is about 2 and 3/16 inches high. In some embodiments, the oven is at least about 2 inches high, or at least about 3 inches high, or at least about 4 inches high, or at least about 6 inches high. In some embodiments, the oven is at most about 2 inches high, or at most about 3 inches high, or at most about 4 inches high, or at most about 6 inches high. In some embodiments, in addition to heat radiating into the oven from the grill body and/or fuel chamber above, the legs of the grill body may absorb heat and radiate that heat into the oven from the sides.

In some embodiments, the grill body is a single piece of metal configured to define the fuel chamber and oven. In some embodiments, the grill body includes vent holes located on one or both sides of the grill body. In some embodiments, the vent holes are a fixed diameter and do not require or allow adjustment. Some embodiments of the cooking range may include a vent hole cover which allows a portion of the vent holes to be covered in order to restrict air flow. The vent hole cover may cover one or more of a plurality of vent holes and/or a portion of any single vent hole in order to adjust air flow.

Embodiments of the grill body are equipped with grate hooks. Some embodiments of the grill body include two grate hooks although some embodiments may comprise one, four, six, or more grate hooks. Grate hooks are typically positioned at the upper portion of the rear of the grill body. The grate hooks may be used to mechanically secure a cooking grate to the grill body. In some embodiments, the grate hooks may be used to mechanically secure a shroud to the grill body as well.

Embodiments of the grill body comprise shroud guides. The shroud guides may be located at the upper rear portion of the grill body. Some embodiments include two shroud guides, one on each side of the grill body. In some embodiments, the shroud guides allow a shroud to be variably positioned above the grill body. Allowing a shroud to extend over the cooking grate to varying degrees allows the user to control the amount of heat and smoke retained in the upper cooking area as well as the speed of cooking.

In some embodiments the fuel chamber is configured to be cambered toward the back of the grill body. This configuration allows ashes and the remains of active embers which fall through a fire grate to accumulate at the rear of the fuel chamber. This configuration may also provide easier access to the area beneath the grill body which typically defines the oven. In some embodiments, the oven may be used to keep food warm, melt butter, or toast bread without the use of a bottom burner as the heat from the fuel chamber radiates downward to the oven.

Figure 2:
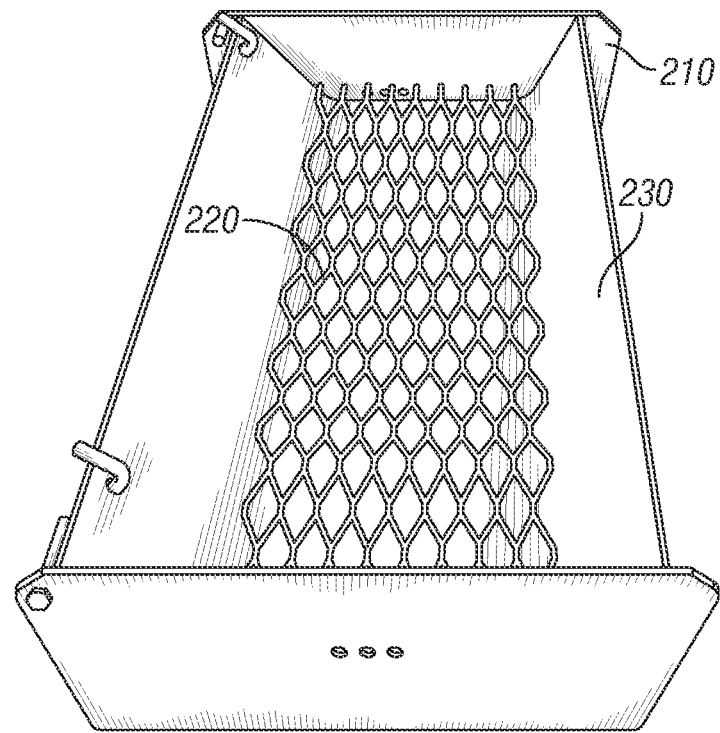
FIG. 2 illustrates a grill body and fire grate according to an example embodiment.

FIG. 2 illustrates a grill body 210 according to an example embodiment. Grill body 210 may support a fire grate 220 within the fuel chamber 230. In some embodiments, the grill body 210 is configured to hold the fire grate 220 substantially level when the fire grate is positioned in the fuel chamber 230. In some embodiments, vent holes may be positioned on the grill body 210 to provide air flow into the fuel chamber 230 below the fire grate 230. This arrangement may facilitate a convective air flow created by the heat of a solid fuel being placed on top of the fire grate 220 and combusting.

Figure 3:
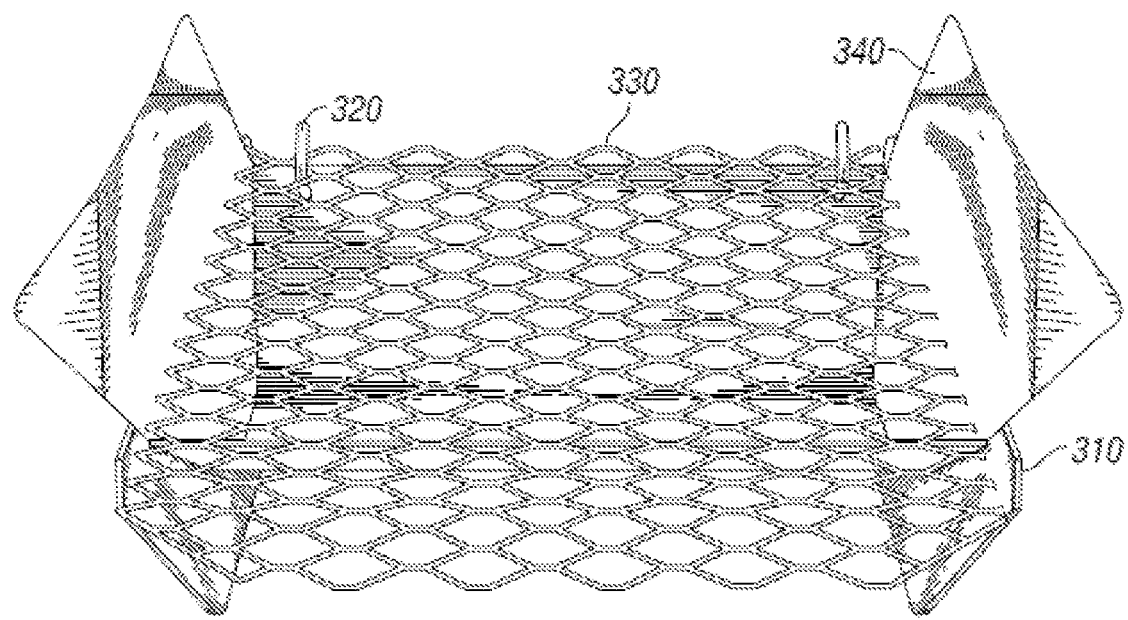
FIG. 3 illustrates a cooking range according to an example embodiment.

FIG. 3 illustrates a cooking range according to an example embodiment. Grill body 310 comprises grate hooks 320. A cooking grate 330 may be selectively attached to the grill body 310 by inserting the grate hooks 320 into openings in the cooking grate 330. It will be appreciated that cooking grate 330 rests on top of the grill body 310 above the fuel chamber and fire grate. End plates 340 may be mounted on the cooking range by sliding the end plates 340 into a space between the grill body 310 and the cooking grate 330. In some examples, the end plates 340 may additionally or alternatively be positioned in a space between the grill body 310 and the fire grate. In some embodiments, the cooking grate 330 extends beyond the front of the grill body 310, creating an overhang. The overhang may provide a cooler portion of the cooking grate allowing a user to manipulate the cooking grate 330 to, for example, add additional charcoal into the fuel chamber below the cooking grate 330. The cooler portion of the cooking grate 330 may also be used to cook food that requires less direct heat. In some embodiments, the cooking grate 330 may be positioned to create an overhang at the front of the grill body 310 as shown in FIG. 3. In some embodiments, the cooking grate 330 may be positioned to create an overhang at the rear of the grill body 310 or to create overhangs at both the front and the rear of the grill body 310. It will be appreciated that the relative size of the cooking grate and grill body may be adjusted to create embodiments including a greater or lesser amount of overhanging cooking grate 330. In some embodiments, the cooking grate 330 is substantially the same dimensions as the top of the grill body 310 and will not create a significant overhang on any side.

Some embodiments of the cooking range include left and right end plates. The end plates allow a user to influence airflow, smoke containment, and temperature by inserting or removing one or both end plates. The end plates may also function to reduce air currents during the charcoal lighting and engulfment process. Control of air flow and temperature with the end plates is more effective when combined with use of the shroud. In some embodiments, the end plates may also be utilized as a hand fan to speed the processes of charcoal lighting or engulfment in low wind conditions.

In some embodiments, the cooking grate may be secured to the grill body in multiple positions resulting in different portions of the grate hanging over the front and/or rear of the grill body. When a shroud is used, the shroud may prevent the grate from hanging over the rear of the grill body. In some embodiments, when the cooking grate is positioned to accommodate the shroud, a portion of the cooking grate may hang over the front edge of the grill body. This may create a portion of the cooking grate which is sufficiently distant from the solid fuel to allow that portion of the cooking grate to cool slightly. The cooler portion of the cooking grate may be used to allow food items to cool or rest.

In some embodiments, a portion of the cooking grate is configured to be cool enough to touch, thereby allowing the user to raise the grate by hand to add wood chips to enhance flavor or additional fuel as needed.

Figure 4:
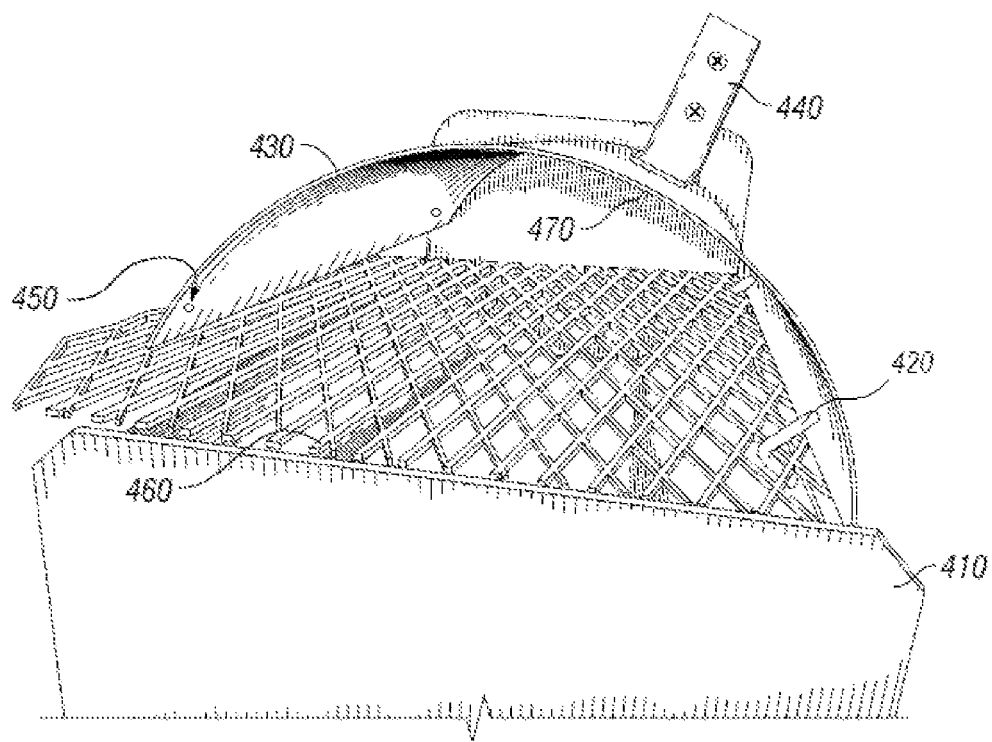
FIG. 4 illustrates a cooking range according to an example embodiment.

FIG. 4 illustrates a cooking range according to an example embodiment. Grill body 410 comprises grate hooks 420. The illustrated embodiment also contains shroud 430 with a handle 440, attachment holes 450, and handle stop 470. The grate hooks 420 may be inserted through openings in the cooking grate 460 and may also be inserted through the attachment holes 450 of the shroud 430. As shown in FIG. 4, the handle 440 of the shroud 430 may be offset from the center. The offset handle 440 may be biased toward either the front or the back of the shroud 430. As the shroud 430 may be slidably inserted into the shroud guides, in some embodiments, either the front or rear of the shroud 430 may be inserted into the shroud guides. In embodiments utilizing an offset handle 440, reversing the shroud 430 allows the handle 440 to be positioned more toward the front of the grill body 410 or more towards the rear of the grill body 410. In some embodiments, the shroud 430 may comprise attachment holes on the front of the shroud, on the rear of the shroud, or both. It will be appreciated that, in an embodiment in which the shroud 430 comprises attachment holes 450 on only one side of the shroud, the shroud 430 will need to be positioned appropriately to align the attachment holes 450 and the guide hooks 420.

In some embodiments, handle stops 470 may be configured to engage the cooking grate to maintain the position of the shroud. It will be appreciated that when the shroud 430 is closed or the handle stop 470 is not in contact with the cooking grate, the handle stop 470 remains on the interior of the shroud 430. In some embodiments, the handle stop 470 may be part of, or may include a fastener that attached the handle 440 to the shroud 430.

In some embodiments, the shroud and/or the shroud handle comprises a retaining hook which allows the shroud to be hung without placing it on the ground. In some embodiments, the shroud hook is configured to be hung from an end plate.

In some embodiments, the cooking grate 460 supports the shroud 430 when the shroud 430 is fully closed. The cooking grate 460 is an open material that allows air to pass through. This configuration allows some airflow in and/or out of the upper cooking area even when the shroud is fully closed. As air may pass through the cooking grate 460, embodiments of the disclosed cooking range may operate without a smoke stack or other dedicated exhaust port.

Embodiments of the cooking range include a shroud which may be utilized with or without one or both of the end plates. The independent shroud enables several discrete configurations of the disclosed cooking range including utilizing attachment holes in the shroud to mechanically attach the shroud to the grate hooks. This may be particularly desirable in high wind conditions to prevent the shroud from being blown out of position.

During the lighting and engulfment process, the shroud may be removed from the cooking range. During cooking, the shroud may be positioned over the cooking grate by sliding the shroud into the shroud guides. When placed in this position, the shroud reflects heat back down to the food item being cooked while also helping to retain accumulated heat and smoke.

In some embodiments, the shroud weighs about 6 ounces. In some embodiments, the shroud weighs less than about 4 ounces, less than about ounces, less than about 8 ounces, or less than about 10 ounces. In some embodiments, the shroud weighs more than about 4 ounces, more than about 5 ounces, more than about 8 ounces, or more than about 10 ounces.

In some embodiments, the shroud may be removable from the cooking range. When the cooking range is not covered, more air may be allowed to reach the solid fuel.

In addition to containing heat and smoke in high wind conditions, the shroud may also provide the added benefit of preventing food from rolling off the cooking grate by providing a barrier at the back of the cooking grate. When the shroud is closed, it may create a similar barrier at the front of the cooking grate as well. The shroud may be retained within the shroud guides which facilitate selectively opening and closing the shroud by sliding the shroud to the desired position.

In some embodiments, the shroud includes a handle and fasteners which retain the handle to the shroud. In some embodiments, as the shroud is adjusted within the shroud guides, the handle fasteners include a handle stop that may rest on the grill body or cooking grate to maintain the shroud in a particular position.

In some embodiments, the handle may be offset towards the front or rear of the shroud as opposed to being positioned centrally. In some embodiments, the shroud may be reversible such that there are two distinct configurations created by resting the handle stops on the cooking grate. In some embodiments, the shroud is configured to be about the same height as the end plates when the shroud handle stops engage the cooking grate. In some embodiments, the shroud may be continuously, slidably, adjusted in the shroud guides in order to cover substantially any desired portion of the cooking grate.

Unlike a traditional grill lid, the shroud does not enclose the sides of the cooking range. In order to enclose the sides of the grill, thereby creating a substantially closed environment to retain heat and smoke, one or both end plates may be utilized.

In some embodiments, the shroud may be attached to an extension which raises the total height of the shroud, creating a larger enclosed upper cooking area. In some embodiments, this shroud extension may be referred to as a brisket bar. The brisket bar extends about the full length of the shroud and is placed between the shroud and front of the grill body, thereby enclosing the upper cooking area. In some embodiments, a large food item, such as a brisket, may be cooked or smoked by placing the food item directly on the fire grate and heating the grill body using solid fuel placed in the oven. It will be appreciated that in such applications, the cooking grate may be removed or not installed so that the volume between the fire grate and the expanded shroud may be utilized more completely. Heat may be transferred from the oven, up into the upper cooking area. In some embodiments, a user may add wood pellets or other additives to control the smoke flavor imparted to the food item. For longer duration cooking, the user may need to add new solid fuel to the oven periodically to maintain heat in the upper cooking area for an extended period. Using this method, a large brisket may be smoked using embodiments of the disclosed cooking range.

Figure 5:
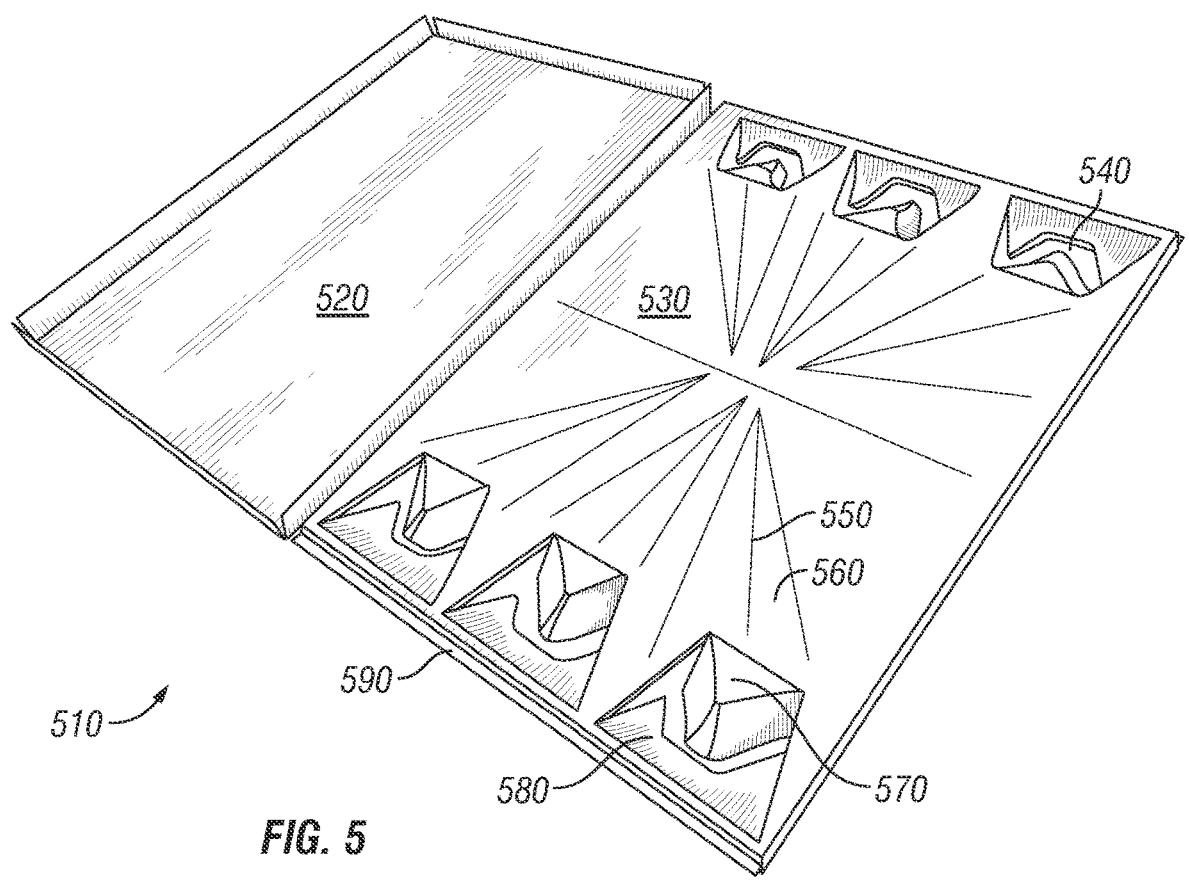
FIG. 5 illustrates a bottom burner according to an example embodiment.

FIG. 5 illustrates a bottom burner 510 according to an exemplary embodiment. Bottom burner 510 comprises a base pan 520 and a burner plate 530. The base pan 520 may be formed from a single piece of sheet metal. In some embodiments, base pan 520 comprises vents. The vents may be located at the corners of the base pan 520 or machined into the sides of the base pan 520. The burner plate 530 may comprise charcoal receptacles 540, peaks 550, and/or valleys 560. In some embodiments, the burner plate comprises a grill body support flange 590 configured to support the weight of the grill body when the grill body is inserted into the grill body receiving slot.

In some embodiments, the burner plate comprises a central air intake located generally in the middle of the burner plate. The peaks may be aligned with the central air intake and generally radiate from the central air intake to the approximate center of the charcoal receptacles.

In some embodiments, a charcoal receptacle 540 may comprise a triangular portion 570 configured to cause a charcoal briquette to roll as it combusts and shrinks. In some embodiments, the triangular portion 570 of the charcoal receptacle 540 is defined by a non-depressed triangular portion adjacent to a depressed portion 580.

In some embodiments, the depressed portions 580 of the charcoal receptacle 540 allows air to flow into and through the bottom burner 510 and allows ashes from the charcoal briquettes to be collected in the base pan 520. In some embodiments, the burner plate 530 may comprise an exhaust.

In some embodiments, the left and right side of each charcoal receptacle are referred to as ball feeder contact banks. The contact banks may create a tapered shape. In some embodiments, this tapered shape results in a charcoal receptacle that is widest towards the edge of the burner plate. Fresh air may flow from an air intake to the underside of active embers in the charcoal receptacle. In some embodiments, the tapered shape of the ball feeder contact banks use gravity to roll a charcoal ember downward toward the edge of the charcoal receptacle closer to an air intake where air is allowed to flow over the ember. In some embodiments, the rolling motion of the ember helps disturb layers of ash which increases the exposure to oxygen. It will be appreciated that, in some embodiments, only one of the two ball feeder contact banks may come in direct contact with a ball shaped ember. Charcoal briquettes shrink in size as they combust and may quickly become rounded within the charcoal receptacles. The ember may then fall to either side of the inclined conical collector.

Figure 6:
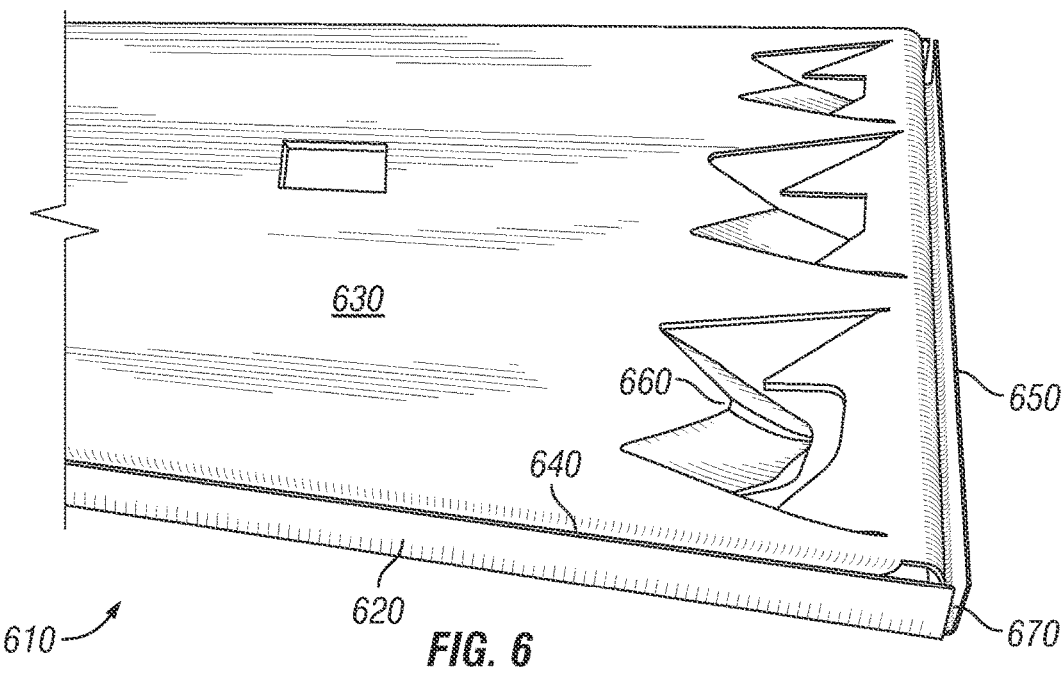
FIG. 6 illustrates a bottom burner according to an example embodiment.

FIG. 6 illustrates a bottom burner 610 according to an exemplary embodiment. Bottom burner 610 comprises base pan 620 and burner plate 630. In the illustrated embodiment, burner plate 630 has been inserted into base pan 620 to form the assembled bottom burner 610. When the burner plate 630 is inserted into the base pan 620, a thin substantially vertical space is defined between the two. In some embodiments, this space is provided around substantially the entire perimeter of the bottom burner. This space forms a slot for receiving a hatch or a planar leg of the grill body. In some embodiments, the bottom burner 610 comprises a front edge, a rear edge, and two side edges.

In some embodiments, the space between the burner plate and the base pan at the front or rear edge defines a hatch slot 640. In some embodiments, the space between the burner plate and the base pan at the lateral edges defines a grill body receiving slot 650. In some embodiments, the charcoal receptacles are aligned along the lateral edges and/or grill body receiving slot 650. In some embodiments, the generally planar legs of the grill body may be inserted into the grill body receiving slot 650. The weight of the grill body may rest on the grill body support flanges and press down on the burner plate. The weight of the grill body is then transferred, through the burner plate to the base pan, thereby holding the bottom burner securely in position within the oven. This configuration prevents the burner plate and/or base pan from being impacted by winds or other forces.

In some embodiments, the front and rear edges of the bottom burner 610 are substantially the same. In some embodiments, the bottom burner 610 may be inserted into the oven in any configuration. Accordingly, the hatch slot 640 that is positioned at the front of the oven may be referred to as the front hatch slot and the hatch slot 640 that is positioned at the rear of the oven may be referred to as the rear hatch slot. It will be appreciated that in some embodiments, the front and rear hatch slots 640 may be essentially the same and be defined by their position relative to the grill body.

Bottom burner 610 comprises charcoal receptacles 660 with depressed and non-depressed portions. The charcoal receptacles 660 comprise a triangular portion configured to allow a charcoal briquette to roll into the depressed portion as the briquette shrinks from combustion. In some embodiments, the agitation caused by the charcoal briquette rolling into the depressed portion causes ash to be shaken off the briquette, thereby allowing more air to contact the burning briquette and allowing the briquette to combust to a greater degree.

In some embodiments, the bottom burner comprises an air intake 670. The air intake 670 may be positioned at the corners, allowing air to enter through the corner of the base pan 620 and into the interior space of the bottom burner 610. This configuration allows air to flow through the space defined between the burner plate 630 and the base pan 620 and reach the combusting fuel in the charcoal receptacles 660.

In some embodiments, the bottom burner is about half an inch tall. In other embodiments, the bottom burner is less than about one inch tall, less than about two inches tall, or less than about three inches tall. In some embodiments, the bottom burner is greater than about one inch tall, greater than about two inches tall, or greater than about three inches tall.

In some embodiments, the bottom burner comprises six charcoal receptacles. In some embodiments, the bottom burner comprises between four and eight receptacles. In some embodiments, the bottom burner comprises between two and twelve receptacles.

In some embodiments, the receptacles are designed to emulate the principle of a ram jet engine, in that a fuel, such as, for example charcoal, may be burned to create heat which is exchanged during the burning process to expand the surrounding gases. This expansion may result in the propulsion of the gases which in turn draws additional air and/or oxygen to the burning charcoal or other solid fuel. In some embodiments, the bottom burner and charcoal receptacles are designed to scavenge hot or expanding gases and deliver the hot and/or expanding gases to the bottom of a pan, or other container that may be used to cook foods.

In some embodiments, a bottom burner is made of metal or another heat conductive material. When a solid fuel is burned in the charcoal receptacles, heat may be conducted from the fuel, through the material of the bottom burner, to a food item or food container on top of the bottom burner. It will be appreciated that this conductive heating is in addition to the heat being emitted from the combusting solid fuel to a food item or food container.

The bottom burner may be positioned within the oven during use. Any heat generated by burning a solid fuel in the fuel chamber above the oven may be at least partially absorbed by the grill body. This heat may be communicated through the grill body and into the oven from above. This arrangement may result in food cooked in the oven being heated from both above and below.

In some embodiments, infrared radiation from the fuel chamber of the grill body is radiated into the oven from above and introduces little to no smoke into the baking process. This may be desirable when baking certain breads as some types of bread are easily fouled by too much smoke.

In some embodiments, a bottom burner may be used as a free standing solid fuel food warmer independent of the grill body. It will be appreciated that in some embodiments, the bottom burner may be removable from the oven although in most uses, the bottom burner is used to heat the oven and/or upper cooking area.

In some embodiments, the bottom burner weighs about 10 ounces. In some embodiments, bottom burner weighs less than about 6 ounces, less than about 8 ounces, less than about 12 ounces, or less than about 16 ounces. In some embodiments, bottom burner weighs more than about 6 ounces, more than about 8 ounces, more than about 12 ounces, or more than about 16 ounces.

In some embodiments, the bottom burner is about ½ inches high. In some embodiments, bottom burner is less than about ½ inches high, less than about % inches high, less than about 1 inch high, less than about 2 inches high, or less than about 3 inches high. In some embodiments, bottom burner is more than about ½ inches high, more than about % inches high, more than about 1 inch high, more than about 2 inches high, or more than about 3 inches high.

In some embodiments, the bottom burner, including the burner plate and base pan comprise sheet metal. In some embodiments, the burner plate and base pan are each fabricated from a single piece of sheet metal. In some embodiments, the material which forms the burner plate and/or base pan may be thinner than about $\frac{1}{32}$nd of an inch, about $\frac{1}{16}$th of an inch, about ⅛th of an inch, about ¼th of an inch, or about ½ of an inch. In some embodiments, the material which forms the burner plate and/or base pan may be thicker than about $\frac{1}{32}$nd of an inch, about $\frac{1}{16}$th of an inch, about ⅛th of an inch, about ¼th of an inch, or about ½ of an inch. Thinner materials may result in a lighter weight device, while thicker materials may be helpful for creating an even heating surface and a more durable device.

Figure 7:
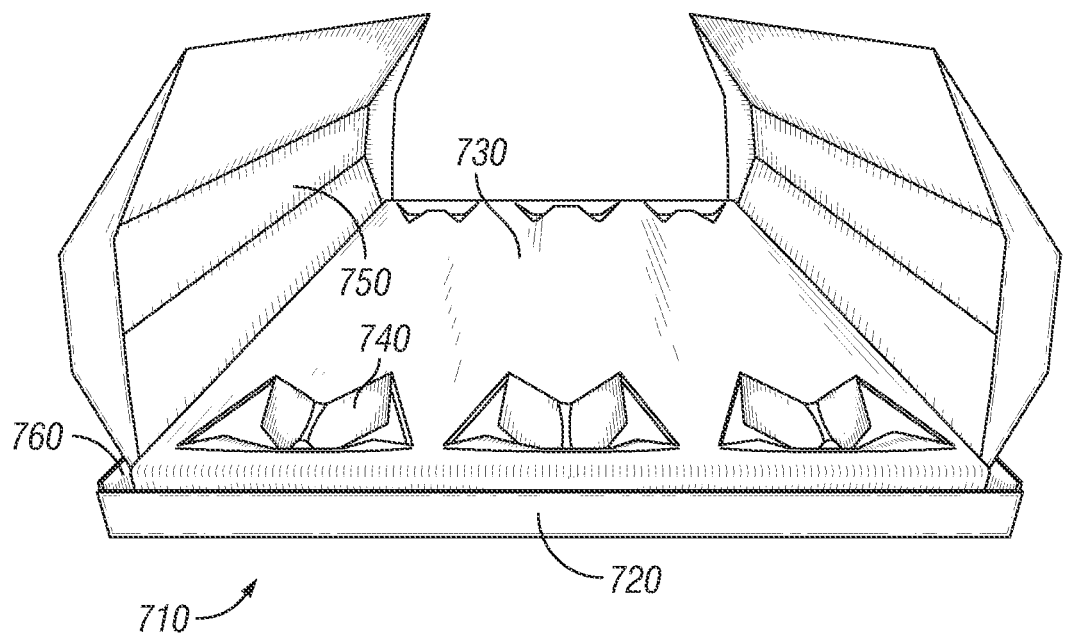
FIG. 7 illustrates a bottom burner according to an example embodiment.

FIG. 7 illustrates a bottom burner 710 according to an exemplary embodiment. Bottom burner 710 comprises a base pan 720 and a burner plate 730. The bottom burner 710 comprises charcoal receptacles 740. The illustrated embodiment includes hatches 750 inserted into the hatch slots 760 created by the base pan 720 and burner plate 730.

In some embodiments, the bottom burner 710 may be inserted into the oven in any configuration. Accordingly, the hatch slot 760 that is positioned at the front of the oven may be referred to as the front hatch slot and the hatch slot 760 that is positioned at the rear of the oven may be referred to as the rear hatch slot. It will be appreciated that in some embodiments, the front and rear hatch slots 760 may be essentially the same and be defined by their position relative to the grill body. Similarly, the hatches 750 that may be inserted into the hatch slots 760 may be defined by their position relative to the grill body. In some embodiments, the hatch 750 that is positioned at the front of the oven may be referred to as the front hatch and the hatch 750 that is positioned at the rear of the oven may be referred to as the rear hatch. In some embodiments, the front and rear hatch may be the same. In some embodiments, the front and rear hatches may be distinct or otherwise not be interchangeable. It will be appreciated that the configuration of the grill body defining the oven, bottom burner defining the hatch slots, and the hatches themselves may all impact the configuration, orientation, and functionality of the other components.

In some embodiments, a hatch is configured to allow air to flow through the bottom burner air intake. This may be accomplished by configuring the portion of the hatch that is inserted into the hatch slot to be slightly shorter than the hatch slot it is inserted into. In some embodiments, this configuration allows air to flow through the bottom burner air intake to the solid fuel in the charcoal receptacles while also allowing the hatch to fully enclose the oven.

In some embodiments, a hatch comprises a handle. The handle may be positioned on the exterior of the hatch at the upper center portion. In some embodiments, the handle may be configured as a loop and/or may be configured to support the hatch when it is placed on a flat surface with the exterior of the hatch down. In some embodiments, the hatch handle is configured to maintain the portion of the hatch that may be inserted into a hatch slot at about the same height as the top of the burner plate or slightly above. In some embodiments, the hatch handle is configured to allow a portion of the hatch to overlap the burner plate when the hatch is laid flat next to the burner plate. In some embodiments, a hatch comprises a reinforced flat portion along the bottom of the hatch known as the keeper. The keeper creates vertical stability of the hatches when inserted into the hatch slots.

In some embodiments, the exterior surface of the hatch is convex. When a user lays the hatch in front of the oven, the hatch acts as a safety device to catch any coals or embers that are dropped when the user transfers coals from the fuel chamber to the charcoal receptacles in the oven. When the user loads charcoal into the oven, the handle and the convex shape of the hatch serve to catch any charcoal or embers that might be dropped. In some embodiments, the handle elevates the hatch to direct inadvertently dropped embers into the oven. In some embodiments, the handle and convex shape of the hatch causes a portion of the hatch to be at about the same height as the bottom burner when the hatch is laying down, thereby facilitating the transfer of any dropped coals or embers from the hatch into the oven.

In some embodiments, the front and rear hatches may be used in various configurations to reflect, retain, and control heat for cooking. In some embodiments, the hatches and/or the end plates may be used to enable the bottom burner to perform as an emergency radiant heater.

Figure 8:
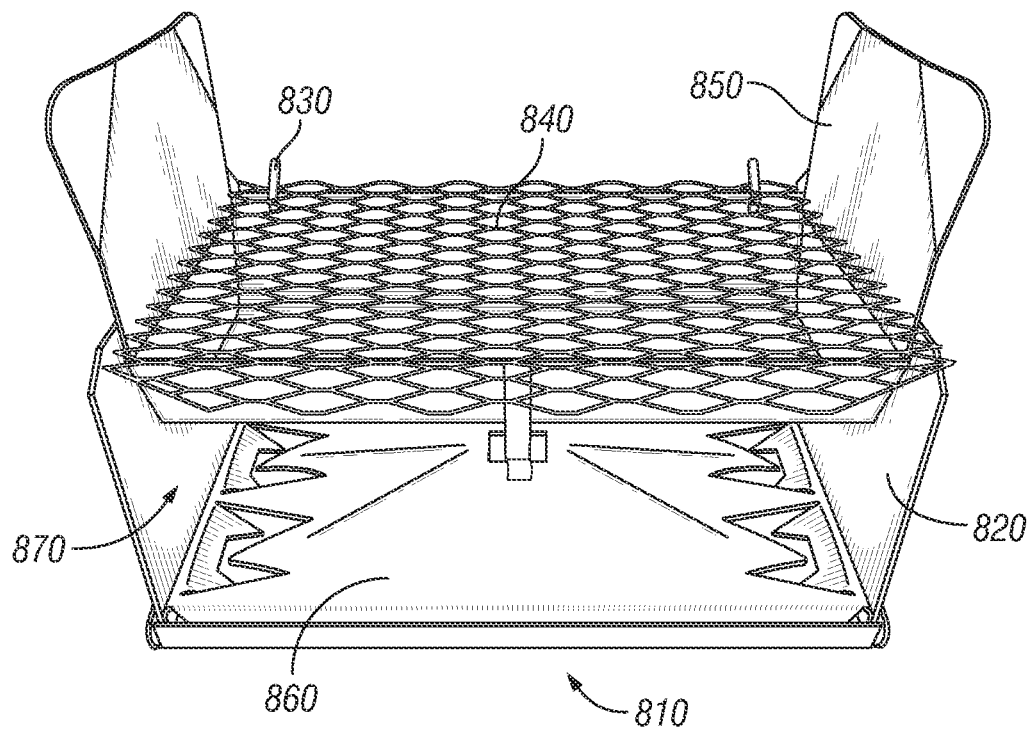
FIG. 8 illustrates a cooking range according to an example embodiment.

FIG. 8 illustrates a cooking range 810 according to an exemplary embodiment. The illustrated cooking range 810 comprises a grill body 820 with grate hooks 830, cooking grate 840, end plates 850, and bottom burner 860 positioned within the oven 870. The grill body 820 comprises a fuel chamber (not shown) where charcoal and/or other solid fuel may be burned to generate heat.

In operation a user may place food on top of the cooking grate 840 to be heated by the solid fuel combusting in the fuel chamber of the grill body 820. Heat from the fuel chamber will also radiate into the top of the oven 870 which is defined by the bottom of the fuel chamber. End plates 850 and/or a shroud (not shown) may be used to enclose the upper cooking space above the cooking grate 840. Charcoal briquettes may be placed in the charcoal receptacles of the bottom burner 860 to generate additional heat within the oven 870. This configuration allows a user to cook two separate food items using two different methods of cooking. The user may grill an item on the cooking grate 840 while simultaneously baking a different item in the oven 870.

Figure 9:
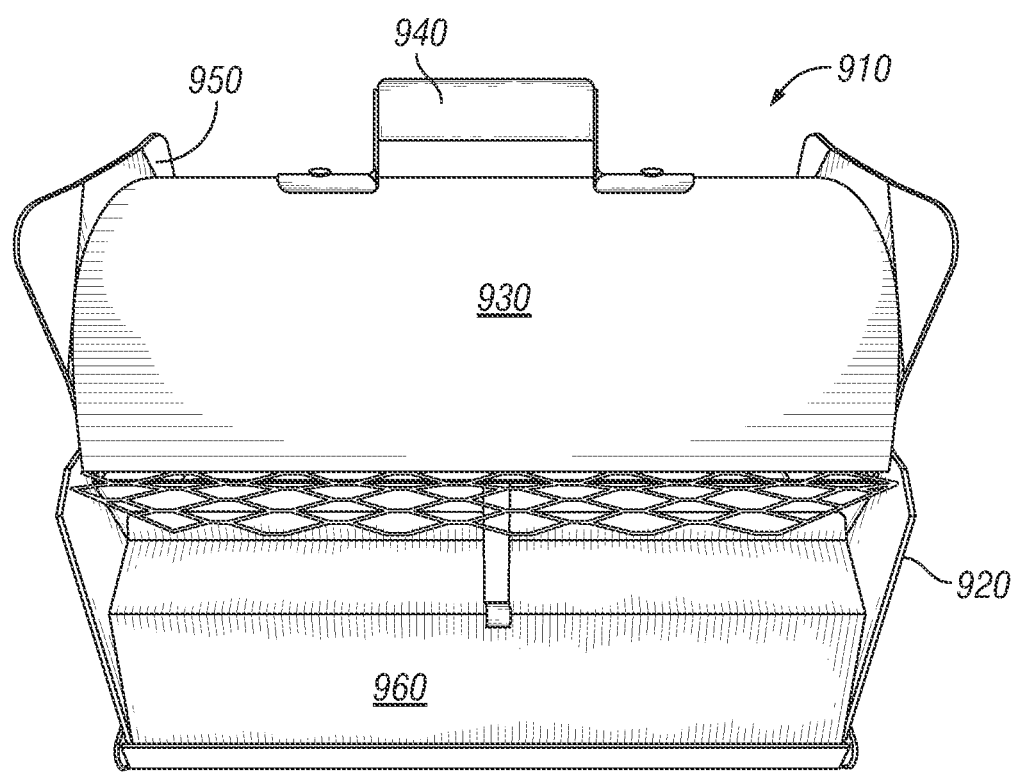
FIG. 9 illustrates a cooking range according to an example embodiment.

FIG. 9 illustrates a cooking range 910 according to an exemplary embodiment. The cooking range 910 is assembled and enclosed. The cooking range 910 comprises a grill body 920, shroud 930 with offset handle 940, end plates 950, and front hatch 960. It will be appreciated that cooking range 910 also comprises a rear hatch (not shown).

In operation a user may use embodiments of the disclosed cooking range by placing the legs or sides of the grill body into the grill body receiving slots of the bottom burner. The weight of the grill body pushes down on the grill body receiving flanges of the burner plate which in turn presses the burner plate down onto the base pan. This configuration creates a stable assembly with the bottom burner held securely in place within the oven created by the grill body. The user may stack charcoal briquettes onto the fire grate that is positioned within the fuel chamber. The user may ignite the briquettes and allow them to be engulfed. This may result in a white powdery ash covering the briquettes. The user may insert the rear hatch into the rear hatch slot to enclose the back of the oven. The user may then lay the front hatch in front of the bottom burner where the front hatch acts as a safety device to catch any hot coals which may be dropped as the user transfers coals from the fire grate to the charcoal receptacles of the bottom burner. The user may insert the front hatch into the front hatch slot or may leave the front hatch open to facilitate placing food in the oven. The user may spread the remaining coals evenly across the fire grate and place the cooking grate onto the grill body by inserting the grate hooks into holes in the cooking grate.

The user may optionally insert one or two end plates into the left and/or right spaces between the grill body and the cooking grate. The user may insert the shroud into the shroud guides and adjust the shroud to a desired position. Depending on what is being cooked, the user may close the shroud and secure it in place by inserting the grate hooks through the attachment holes and allow a food item to cook for the desired period of time.

Figure 10:
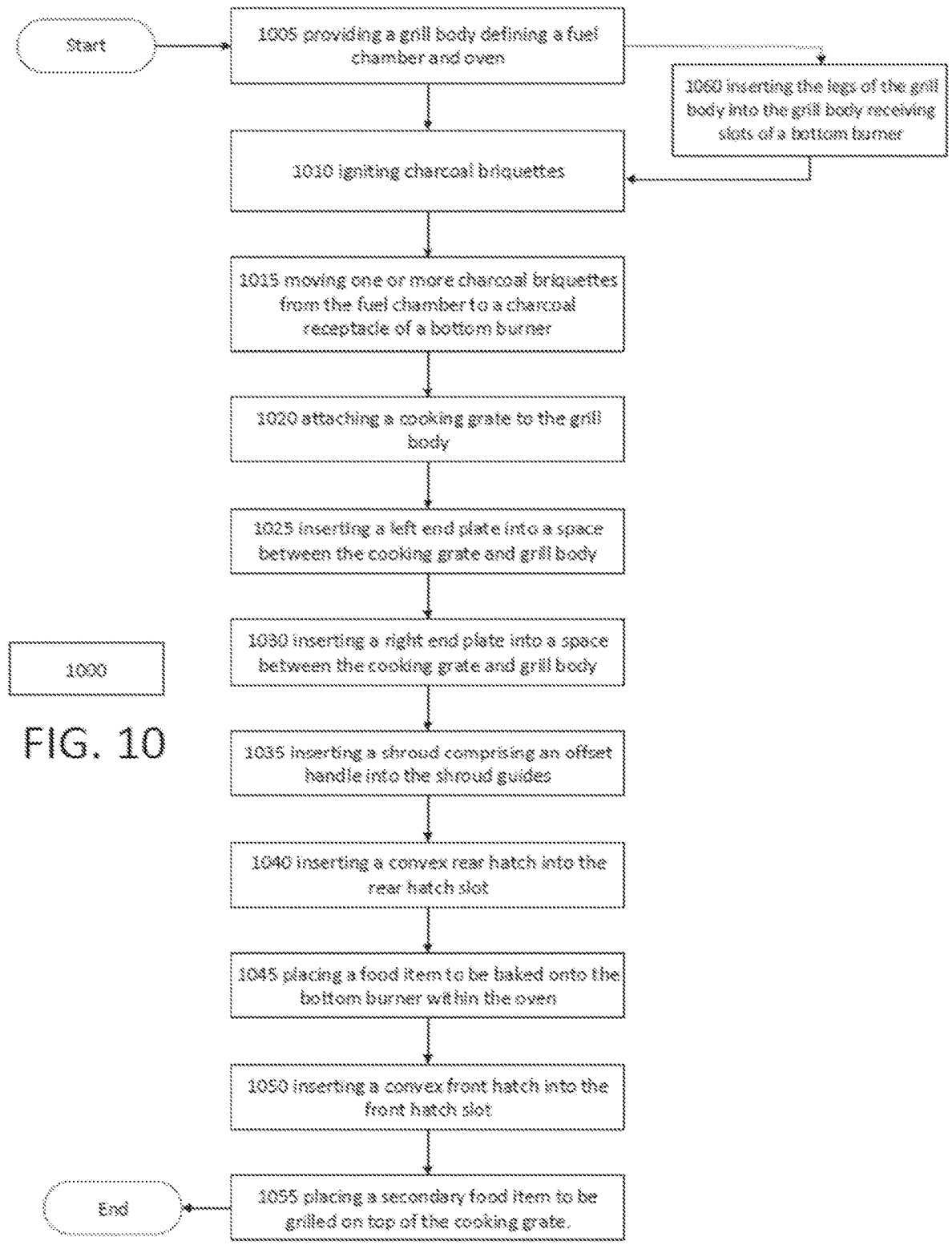
FIG. 10 is a flowchart illustrating a method of operating a cooking range according to an example embodiment.

FIG. 10 illustrates a flow chart of method 1000 for utilizing a cooking range according to an example embodiments. Method 1000 commences at step 1005 comprising providing a grill body defining a fuel chamber and oven. The oven is defined by the space below the fuel chamber. The grill body comprising grate hooks and shroud guides. Step 1010 comprises igniting charcoal briquettes on top of a fire grate positioned within the fuel chamber. The fire grate allows air to reach the briquettes as they are being ignited. Step 1015 comprises moving one or more charcoal briquettes from the fuel chamber to a charcoal receptacle of a bottom burner placed within the oven. Optionally, the method includes placing an oven hatch adjacent to the bottom burner to collect any embers that may fall off of a briquette as it is being moved. Step 1020 comprises attaching a cooking grate to the grill body above the fuel chamber by inserting the grate hooks into openings in the cooking grate. Step 1025 comprises inserting a left end plate into a space between the cooking grate and grill body. Step 1030 comprises inserting a right end plate into a space between the cooking grate and grill body. Step 1035 comprises inserting a shroud comprising an offset handle into the shroud guides.

In some embodiments, the bottom burner comprises a burner plate and a base pan. The base pan may be configured to receive the burner plate and form a front hatch slot and a rear hatch slot between the burner plate and base pan. In some embodiments, method 1000 may further comprise, at step 1040, inserting a convex rear hatch into the rear hatch slot. Step 1045 comprises placing a food item to be baked onto the bottom burner within the oven. After placing an item to be baked onto the bottom burner within the oven, step 1050 comprises inserting a convex front hatch into the front hatch slot. In some embodiments, method 1000 comprises, at step 1055 placing a secondary food item to be grilled on top of the cooking grate.

In some embodiments, method 1000 comprises, at step 1060, inserting the legs of the grill body into the grill body receiving slots of a bottom burner. In some embodiments, the burner plate of the bottom burner comprises a grill body receiving flange configured to support the weight of the grill body and transfer the weight to the base pan.

In some embodiments, the disclosed cooking range is easily portable. Some embodiments may be useful as a survival device in emergency situations. Embodiments may additionally and/or alternatively be used as a peripheral device for outdoor cooking by providing a secondary, grilling and/or baking device. In some embodiments, the disclosed cooking range may serve as a primary outdoor cooking device for those with limited space such as grillers who live in apartment dwellings or travel in recreational vehicles. The disclosed devices may also be used while tailgating or camping based on its portability and versatility.

In some embodiments, the grill body is substantially rectangular which facilitates the storage and portability of some disclosed embodiments. This generally rectangular shape allows the charcoal cooking range to be stackable for easy storage and transportation. Additionally, in certain embodiments the rectangular grill body is less than about 8 inches in length, less than about 10 inches in length, less than about 12 inches in length, less than about 14 inches in length, less than about 16 inches in length, or less than about 18 inches in length.

In some embodiments, the rectangular grill body may be less than about 6 inches in width, less than about 9 inches in width, less than about 12 inches in width, or less than about 16 inches in width.

In some embodiments, the grill body may be less than about 4 inches high, less than about 6 inches high, less than about 7 inches high, less than about 9 inches high, or less than about 12 inches high.

In some embodiments, the grill body is configured so the other components of the cooking range may be packaged within the interior space of the grill body in order to create a single portable unit. In some embodiments, the grill body is configured to weigh less than about 5 pounds, less than about 7 pounds, or less than about 10 pounds. The lightweight nature of the device may be advantageous when carrying the charcoal cooking range for potentially long distances. The lightweight nature of the disclosed cooking range, combined with the ability to operate using multiple solid fuels, as opposed to liquid or gas combustibles, may be advantageous for use outdoors and/or in emergency applications.

Some embodiments of the cooking range comprise a lower insulator. The lower insulator can comprise silicon, polymer, wood, heat-resistant rubber, and/or other materials that are thermal insulators. In some embodiments, the lower insulator provides increased friction to prevent movement of the cooking range while in use.

When cooking with the disclosed cooking range, the range will perform substantially the same under substantially similar conditions. As each brand and type of charcoal briquettes may vary, after a given count of briquettes has been utilized to provide a desirable outcome, the user can expect substantially similar results under substantially similar conditions. This may be used to determine a desired count of charcoal briquettes and a desirable timing and/or duration used to cook various food items in either the upper cooking area or the oven.

Charcoal briquettes typically burn for approximately two hours and produce less energy as they shrink due to combustion. Although it is common to regularly add unlit briquettes to the flames or already burning coals, in some instances, it is better to light and engulf briquettes elsewhere prior to adding the briquettes to the cooking embers. This is because coals that are engulfed with embers typically burn cleaner and hotter. By adding additional solid fuel to the already burning fuel, a user may cook for as many hours as desired.

Throughout the specification, reference is made to various components of the disclosed cooking range. However, it is understood that the present disclosure is not limited to the particular components or form, design, or configuration of components disclosed. An ordinary artisan will recognize modifications and combinations which are intended to be within the scope of this application. In particular, the features disclosed in the context of one embodiment may be combined with the features disclosed in the context of any other embodiment.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed methods and systems may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed systems have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A portable solid fuel cooking range comprising:
    a grill body defining a fuel chamber and an oven wherein the oven is positioned below the fuel chamber;
    a fire grate configured to support a solid combustible fuel within the fuel chamber and allow airflow to the solid combustible fuel placed on top of the fire grate;
    a cooking grate configured to cover the fuel chamber and be selectively attachable to the grill body;
    a shroud configured to attach to the grill body;
    a left end plate and a right end plate, the end plates configured to be positioned between the grill body and the cooking grate;
    a bottom burner configured to be placed within the oven, the bottom burner comprising a burner plate and a base pan, the base pan configured to receive the burner plate, and a grill body receiving slot between the burner plate and the base pan, the burner plate comprising charcoal receptacles.

2. The portable solid fuel cooking range of claim 1, wherein the grill body is configured to communicate heat from the fuel chamber to the oven.

3. The portable solid fuel cooking range of claim 1, wherein the fuel chamber is configured to maintain the fire grate substantially level with respect to the grill body.

4. The portable solid fuel cooking range of claim 1, wherein the shroud comprises attachment holes configured to receive a grate hook of the grill body to retain the shroud in a closed position.

5. The portable solid fuel cooking range of claim 1, wherein the shroud comprises a handle stop configured to engage the cooking grate to support the shroud in a stable position.

6. The portable solid fuel cooking range of claim 1, further comprising a front hatch and a rear hatch.

7. The portable solid fuel cooking range of claim 6, wherein the exterior surfaces of the front and rear hatches are convex.

8. The portable solid fuel cooking range of claim 1, wherein the oven is configured to store the shroud, left and right end plates, and bottom burner when not in use.

9. The portable solid fuel cooking range of claim 1, wherein the cooking grate is configured to extend at least one inch beyond the grill body when the cooking grate is attached to a grate hook of the grill body.

10. The portable solid fuel cooking range of claim 1, wherein the charcoal receptacles comprise a depressed portion and a non-depressed portion.

11. The portable solid fuel cooking range of claim 1, wherein the charcoal receptacles comprise a triangular portion configured to roll a charcoal briquette as it combusts.

12. The portable solid fuel cooking range of claim 1, wherein the burner plate is formed to include peaks and valleys.

13. The portable solid fuel cooking range of claim 12, wherein the valleys of the burner plate are offset from the charcoal receptacles and the peaks are aligned with the charcoal receptacles.

14. The portable solid fuel cooking range of claim 1, wherein the left and right end plates each comprise a rotisserie support.